US010108353B2

(12) United States Patent
Hsu et al.

(10) Patent No.: US 10,108,353 B2
(45) Date of Patent: *Oct. 23, 2018

(54) SYSTEM AND METHOD FOR PROVIDING LONG-TERM STORAGE FOR DATA

(71) Applicant: EMC Corporation, Hopkinton, MA (US)

(72) Inventors: Windsor W. Hsu, San Jose, CA (US); R. Hugo Patterson, Los Altos, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/704,774

(22) Filed: May 5, 2015

(65) Prior Publication Data
US 2015/0234616 A1 Aug. 20, 2015

Related U.S. Application Data

(63) Continuation of application No. 14/105,490, filed on Dec. 13, 2013, now Pat. No. 9,052,832, which is a continuation of application No. 12/459,201, filed on Jun. 25, 2009, now Pat. No. 8,635,184.

(51) Int. Cl.
*G06F 17/30* (2006.01)
*G06F 3/06* (2006.01)

(52) U.S. Cl.
CPC .......... *G06F 3/0619* (2013.01); *G06F 3/0641* (2013.01); *G06F 3/0685* (2013.01)

(58) Field of Classification Search
USPC .................................................. 707/609, 640
See application file for complete search history.

(56) References Cited

U.S. PATENT DOCUMENTS

| | | | | |
|---|---|---|---|---|
| 5,649,196 A | * | 7/1997 | Woodhill | G06F 11/1451 707/999.009 |
| 7,020,664 B1 | | 3/2006 | Yamaguchi et al. | |
| 7,519,635 B1 | | 4/2009 | Haustein et al. | |
| 8,074,043 B1 | * | 12/2011 | Zeis | G06F 17/30156 711/162 |
| 8,447,740 B1 | * | 5/2013 | Huang | G06F 17/30156 707/640 |
| 8,527,455 B2 | | 9/2013 | Patterson | |
| 8,572,055 B1 | * | 10/2013 | Wu | G06F 17/30097 707/697 |
| 9,436,723 B2 | * | 9/2016 | Lumb | G06F 3/0608 |
| 2003/0135514 A1 | | 7/2003 | Patel et al. | |

(Continued)

FOREIGN PATENT DOCUMENTS

WO 2009064720 5/2009

*Primary Examiner* — Kim Nguyen
(74) *Attorney, Agent, or Firm* — Womble Bond Dickinson (US) LLP

(57) ABSTRACT

A system for storing files comprises a processor and a memory. The processor is configured to break a file into one or more segments; store the one or more segments in a first storage unit; and add metadata to the first storage unit so that the file can be accessed independent of a second storage unit, wherein a single namespace enables access for files stored in the first storage unit and the second storage unit. The memory is coupled to the processor and configured to provide the processor with instructions.

23 Claims, 8 Drawing Sheets

(56) References Cited

U.S. PATENT DOCUMENTS

| | | |
|---|---|---|
| 2004/0133577 A1 | 7/2004 | Miloushev et al. |
| 2005/0210055 A1 | 9/2005 | Rogers et al. |
| 2008/0126357 A1 | 5/2008 | Casanova et al. |
| 2008/0263109 A1 | 10/2008 | Patterson |
| 2009/0049260 A1* | 2/2009 | Upadhyayula ........ G06F 3/0608 711/162 |
| 2009/0132616 A1 | 5/2009 | Winter et al. |
| 2009/0144440 A1* | 6/2009 | Subbanna ......... G06F 17/30171 709/233 |
| 2009/0276647 A1 | 11/2009 | Boyd |
| 2010/0082547 A1* | 4/2010 | Mace ................... G06F 11/1435 707/648 |
| 2010/0088349 A1* | 4/2010 | Parab ............... G06F 17/30156 707/802 |
| 2010/0125553 A1 | 5/2010 | Huang et al. |
| 2011/0016083 A1 | 1/2011 | Patterson |
| 2012/0191931 A1* | 7/2012 | Bricker ............... G06F 11/2097 711/162 |

\* cited by examiner

SYSTEM AND METHOD FOR PROVIDING LONG-TERM STORAGE FOR DATA

CROSS REFERENCE TO OTHER APPLICATIONS

This application is a continuation of co-pending U.S. patent application Ser. No. 14/105,490, entitled SYSTEM AND METHOD FOR PROVIDING LONG-TERM STORAGE FOR DATA filed Dec. 13, 2013 which is incorporated herein by reference for all purposes, which is a continuation of U.S. patent application Ser. No. 12/459,201, now U.S. Pat. No. 8,635,184, entitled SYSTEM AND METHOD FOR PROVIDING LONG-TERM STORAGE FOR DATA filed Jun. 25, 2009 which is incorporated herein by reference for all purposes.

BACKGROUND OF THE INVENTION

Organizations are generating and accumulating increasingly large amounts of electronic data that needs to be properly retained and promptly accessible when needed. Given the large volume of data involved and the extended retention period for much of this data, it is critical that a storage system be cost-effective and energy-efficient. In addition, the storage system should also be resilient to partial failures of the system. In addition, the storage system should allow for incremental growth in capacity, facilitate upgrades to the system, and migration of data to new storage devices.

BRIEF DESCRIPTION OF THE DRAWINGS

Various embodiments of the invention are disclosed in the following detailed description and the accompanying drawings.

DETAILED DESCRIPTION

Figure 1:
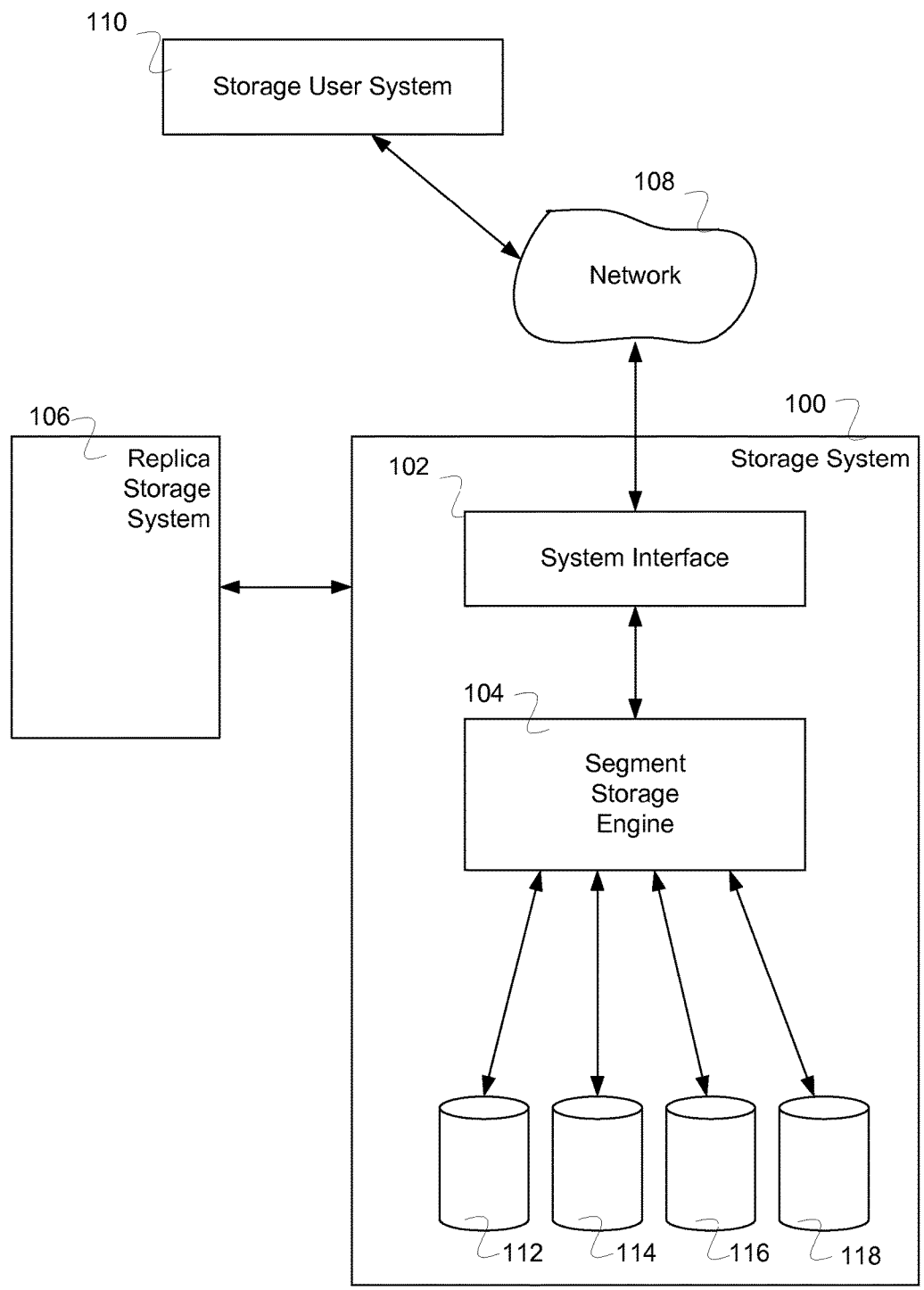
FIG. 1 is a block diagram illustrating an embodiment of a system for long term storage for data.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Providing long term storage for data is disclosed. A file is broken into one or more segments. The one or more segments are stored in a first storage unit. Metadata is added to the first storage unit so that the file can be accessed independent of another storage unit. A single namespace enables access for files stored in the first storage unit and another storage unit.

In some embodiments, a storage system is able to be cost-effectively and energy efficiently used to store files. The files are stored as one or more segments, where the segments are deduplicated (e.g., only one copy is stored and is/can be used to reconstruct more than one file) in the storage system (e.g., deduplicated across one storage unit of the system). Segments are stored in a main storage unit and periodically (e.g., every week), based on a transfer protocol (e.g., storage unit is above a capacity limit, a number of segments every hour, when inactive, etc.), or when the storage unit is full or meets one or more conditions (e.g., is 80% full, is less than 20% active, has had no accesses in last hour, etc.), segments belonging to files identified based on a migration policy (e.g., files of a certain file type that have not been modified or accessed for a predetermined period of time are to be migrated, etc.) are transferred to a second storage unit. As the second storage unit is filled, metadata is transferred to the second storage unit so that the second storage unit has all the necessary information to access files in the second storage unit. The metadata enables the system to reconstruct files that are stored in the system (e.g., in the whole system, in a storage unit, etc.) and/or associated files that are stored in the system with their file names. This also allows the system to power down a storage unit for energy conservation or to take a storage unit off-line to upgrade a storage unit or to enable the system to be fault tolerant in that the system can operate if any given storage unit fails. When a storage unit fills, the system transfers segments from the main storage unit to another storage unit. The system can be expanded by adding storage units incrementally. Files are accessed using the single name space providing an easy to use interface. Hardware is efficiently used as only one deduplicating engine is used for multiple storage units.

In some embodiments, the system does not have a main storage unit and stores segments in a first storage unit and then when the first storage unit is full, the system stores segments in a second storage unit.

In some embodiments, a file is identified by a name that is independent of the storage unit the file is stored in. When a file is received to be stored, a name is also received to be associated with the file. When a request to read a file is received, a name is also received. The system looks up the metadata associated with the files in the system to identify the file associated with the received name. It then looks up the metadata associated with the identified file to determine the storage unit the identified file is stored in. In various embodiments, the metadata associated with the files in the system is maintained in a main storage unit, is maintained in each storage unit where the files associated with the metadata are stored, is maintained in a distributed and/or redundant manner across many storage units (e.g., for fault tolerance), is maintained in a separated storage unit or storage unit, or any other appropriate storage location.

In some embodiments, when a next available storage unit is identified (e.g., selected) as the active storage unit, the metadata associated with the files in the system is copied to the active storage unit. This allows the metadata associated with the files in the system to be available when only the storage unit is powered up. In some embodiments, subsequent updates to the metadata associated with the files are made only to the copy of the metadata stored in the active storage unit.

In some embodiments, if the active storage unit is full, all metadata updates are flushed to the active storage unit so that each storage unit contains at least enough metadata to provide access to the files it contains. When the active storage unit fails, the system uses the metadata contained in other attached storage units (e.g., a previously active storage unit) to provide access to the files still in the system. In some embodiments, when a storage unit is unavailable (e.g. the storage unit has failed, is being upgraded, etc.), the system remains up to provide access to any file not stored in the failed storage unit.

In some embodiments, the system includes a power management unit. In the event that a storage unit is predicted to be idle for some time, the system powers down the storage unit. The system is still able to access files on any other storage unit that is not powered down. Subsequently, when the system receives a request directed at the storage unit, the system powers up the storage unit. Powering down a storage unit may include powering off some of the electronics in the disks in the storage unit, spinning down the disks, powering down the disks and/or powering down the electronics in the storage unit, or any other appropriate power saving step. The power down action may depend on how long the storage unit is predicted to be idle. In some embodiments, the length of time a storage unit is predicted to be idle is based on how long the storage unit has been idle. For example, if a storage unit has not received any request for a predetermined period of time, the disks in the storage unit are spun down. In the event that the storage unit has not received any request for a further predetermined period of time, the disks in the storage unit are powered off. In some embodiments, the system tracks the number of times a disk has been power cycled and uses the power cycling information to determine the appropriate power down action. For example, when the number of power cycles exceeds a predetermined threshold, the system may decide not to power down the disk any more.

In some embodiments, in the event that a file is deleted, the metadata associated with the files in the system is updated to reflect that the file is deleted. Subsequently, a space reclamation process is performed to compact the remaining files to fill up entire storage units by transferring files that have not been deleted from a storage unit (e.g., a container, drive, array of drives, etc.) to a new storage unit and deduplicating segments stored in the new storage unit. Once files have been transferred from the old storage unit, the storage unit can be made available to store new files.

In some embodiments, the system is a deduplicating storage system (e.g., a storage system of Data Domain, Inc. of Santa Clara, Calif.). Each storage unit is a deduplication domain, meaning that duplicate chunks of data (e.g., segments) are identified only within each storage unit and not across different storage units. Each storage unit contains a segment index that can be used to determine whether a segment already exists in the storage unit. In some embodiments, the segment index uses fingerprints to index segments.

In some embodiments, the system described is used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to this invention. In various embodiments, tiers comprise different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

In some embodiments, the storage system follows a retention policy where files of different ages are retained or not retained (e.g., files older than 7 years are removed). In some embodiments, the retention policy is dependent on type of file (e.g., financial information is retained indefinitely, email is retained for 1 year, tax information is retained 7 years, etc.).

FIG. 1 is a block diagram illustrating an embodiment of a system for long term storage for data. In the example shown, storage system 100 is accessed by a user using storage user system 110 or by storage user system 110 via network 108. In various embodiments, network 108 comprises one or more of a wired network, a wireless network, a local area network, a wide area network, the Internet, or any other appropriate network. Storage system 100 comprises system interface 102, segment storage engine 104, and a plurality of storage units (represented in FIG. 1 by storage unit 112, storage unit 114, storage unit 116, and storage unit 118). Storage system 100 is replicated using replica storage system 106. For example, a storage unit is replicated by storing segments and metadata stored on the storage unit to another storage unit.

In some embodiments, storage user system 110 sends a file to be stored to storage system 100 via network 108. Storage system 100 receives the file using system interface 102. Segment storage engine 104 breaks the file into segments (e.g., boundaries within a file are identified for one or more segments—for example, a hash function operates on a portion of the content of the file; when the hash function is equal to a value, is a minimum value, is a maximum value, or is an extrema value within a window of the file, etc.). The segments and information to reconstruct the file are stored. Segment storage engine 104 stores the segments in a storage unit (e.g., storage unit 112, storage unit 114, storage unit 116, or storage unit 118). In various embodiments, a storage unit comprises a storage device, multiple storage devices, a portion of a storage device, a hard drive, an array of drives, a semiconductor memory, or any other appropriate storage unit. Segment storage engine 104 only stores a segment in a storage unit if the segment has not been previously stored in the storage unit. In the event that a segment has been previously stored, metadata stores information enabling the reconstruction of a file using the previously stored segment.

In some embodiments, storage user system 110 requests a file that is stored on storage system 100 via network 108. Storage system 100 receives the request for a file using system interface 102. Segment storage engine 104 finds the constituent segments of the file in the appropriate storage unit(s) and reconstructs the file. The file is sent to storage user system 110 via network 108.

In some embodiments, a storage unit stores data in a compressed form (e.g., lossless compression: Huffman coding, Lempel-Ziv Welch coding; delta encoding: a reference to a segment plus a difference; subsegmenting: a list of subsegments or references to subsegments, etc.). In some embodiments, different storage units use different compressions (e.g., main storage unit from other storage units, one storage unit from another storage unit, etc.).

Figure 2:
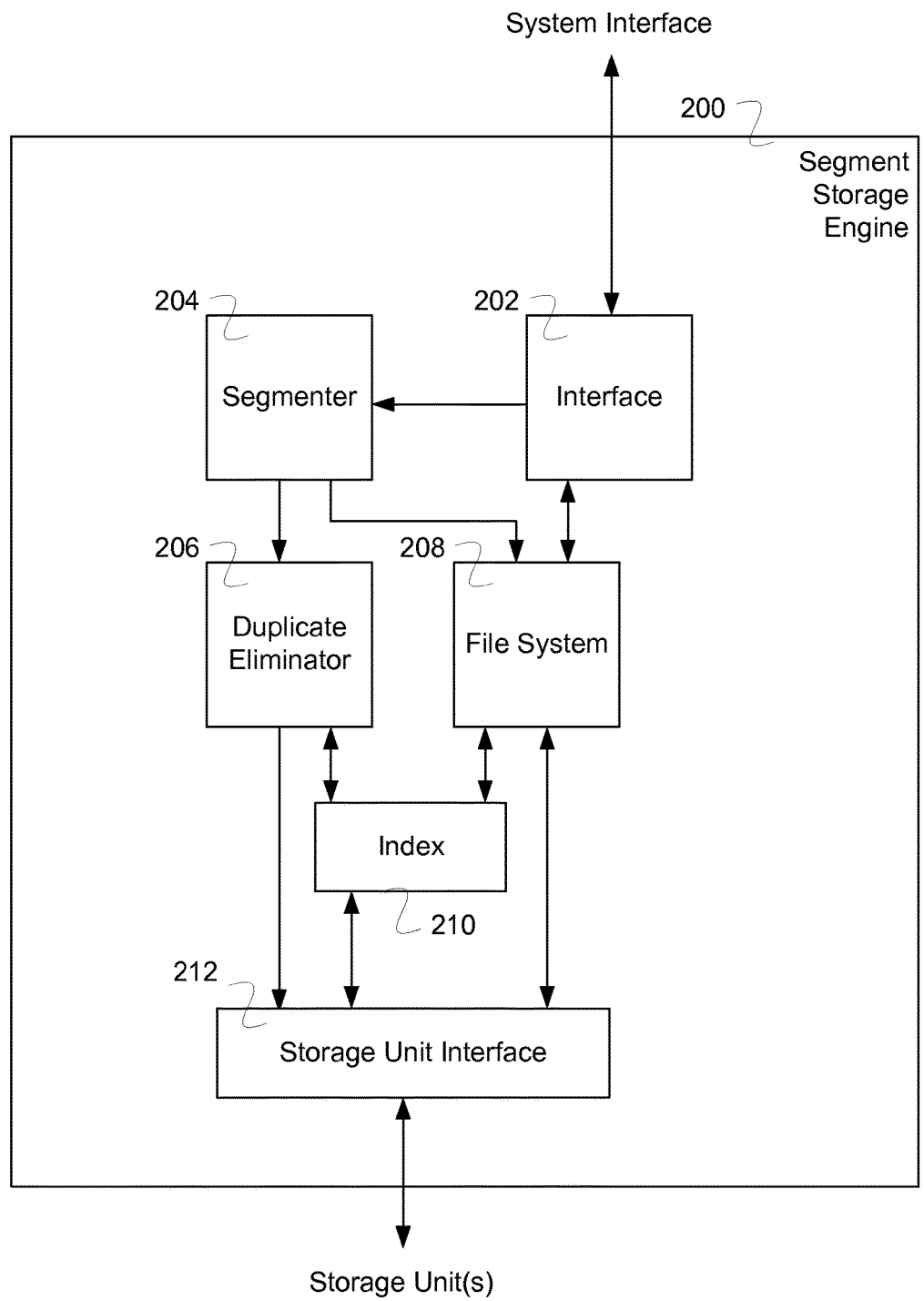
FIG. 2 is a block diagram illustrating an embodiment of a segment storage engine.

FIG. 2 is a block diagram illustrating an embodiment of a segment storage engine. In some embodiments, the system of FIG. 2 is used to implement segment storage engine 104 of FIG. 1 and/or segment storage engine 304 of FIG. 3. In the example shown, segment storage engine 200 comprises interface 202, segmenter 204, duplicate eliminator 206, file system 208, index 210, and storage unit interface 212. Segment storage engine 200 receives data item(s) using interface 202. The data item(s) or file(s) is/are processed by segmenter 204 and file system 208. Segmenter 204 breaks the data item(s) into segments. In various embodiments, the data item(s) are broken into segments by identifying segment boundaries using a content-based technique (e.g., a function is calculated at various locations of a data item, when the function is equal to a value or when the value is a minimum, a maximum, or other extrema value relative to other function values calculated for the data item), a non-content-based technique (e.g., based on data item property—for example, byte length, title, creation date), or any other appropriate technique. In various embodiments, a segment is restricted to a minimum and/or maximum length, to a minimum or maximum number of segments per data item, or any other appropriate limitation. File system 208 processes information to indicate the segment(s) association with a data item. In some embodiments, a list of fingerprints is used to indicate segment(s) associated with a data item. File system 208 passes segment association information to index 210. Index 210 is used to locate stored segments in storage unit(s) using storage unit interface 212.

Duplicate eliminator 206 identifies whether a newly received segment has already been stored in storage unit(s). In the event that a segment has already been stored in storage unit(s), a reference to the previously stored segment is stored instead of storing the newly received segment.

Interface 202 receives a request to retrieve a data item. Interface 202 communicates with file system 208 to identify appropriate segments stored in storage units via storage unit interface 212. File system 208 communicates with index 210 to locate appropriate segments stored in storage units via storage unit interface 212. Appropriate segments are used to construct the requested data item. The data item is provided via interface 202 in response to the request.

In some embodiments, file system 208 and/or index 210 use(s) a tree of content-based identifiers (e.g., fingerprints) to associate a file with data segments and their locations in storage unit(s). In the event that a segment associated with a given file or data item changes, the content-based identifiers will change and the changes will ripple from the bottom to the top of the tree associated with a file name (or directory structure) efficiently since the appropriate content-based identifiers are easily identified using the tree structure.

Figure 3:
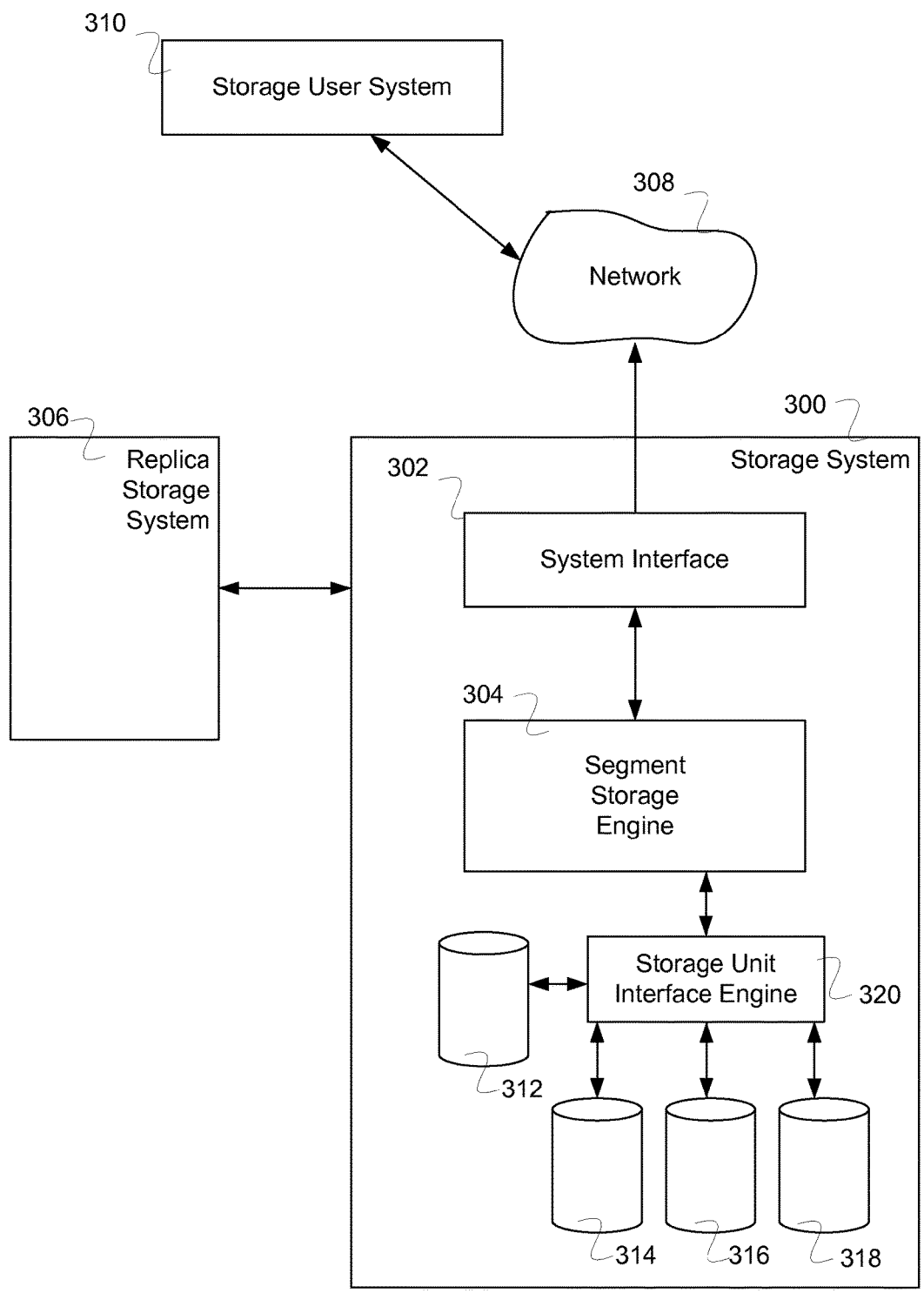
FIG. 3 is a block diagram illustrating an embodiment of a system for long term storage for data.

FIG. 3 is a block diagram illustrating an embodiment of a system for long term storage for data. In the example shown, storage system 300 is accessed by a user using storage user system 310 or by storage user system 310 via network 308. In various embodiments, network 308 comprises one or more of a wired network, a wireless network, a local area network, a wide area network, the Internet, or any other appropriate network. Storage system 300 comprises system interface 302, segment storage engine 304, storage unit interface engine 320, and a plurality of storage units (represented in FIG. 3 by storage unit 312, storage unit 314, storage unit 316, and storage unit 318). Storage system 300 is replicated using replica storage system 306.

In some embodiments, storage user system 310 sends a file to be stored to storage system 300 via network 308. Storage system 300 receives the file using system interface 302. Segment storage engine 304 breaks the file into segments (e.g., boundaries within a file are identified for one or more segments—for example, a hash function operates on a portion of the content of the file; when the hash function is equal to a value, is a minimum value, is a maximum value, or is an extrema value within a window of the file, etc.). The segments and information to reconstruct the file are stored. Segment storage engine 304 stores the segments in main storage unit 312. In accordance with a transfer protocol, a set of transfer conditions, or any other appropriate transfer rules, segments and metadata information are transferred using storage unit interface engine 320 from main storage unit 312 to another storage unit (e.g., storage unit 314, storage unit 316, or storage unit 318). Segment storage engine 304 only stores a segment in a storage unit if the segment has not been previously stored in the storage unit. In the event that a segment has been previously stored, metadata stores information enabling the reconstruction of a file using the previously stored segment.

In some embodiments, storage user system 310 requests a file that is stored on storage system 300 via network 308. Storage system 300 receives the request for a file using system interface 302. Segment storage engine 304 finds the segments used to store the file in the appropriate storage unit(s) and reconstructs the file. The file is sent to storage user system 310 via network 308.

In some embodiments, the main storage unit includes metadata information to access any previously stored file. In some embodiments, the metadata information includes a file name, a storage unit where the segments associated with the file name are stored, reconstruction information for the file using the segments, and any other appropriate metadata information. In some embodiments, a copy of the metadata is stored on a storage unit for files stored on a storage unit so that files that are stored on the storage unit can be accessed using only the information stored on the storage unit. In some embodiments, a main set of metadata information can be reconstructed by using information of all storage units associated with the storage system in the event that the main metadata is lost, corrupted, damaged, etc. In some embodiments, metadata for a storage unit can be reconstructed using metadata information stored on a main storage unit or other storage unit (e.g., replica storage unit). In some embodiments, metadata information includes index information (e.g., location information for segments in storage units).

Figure 4:
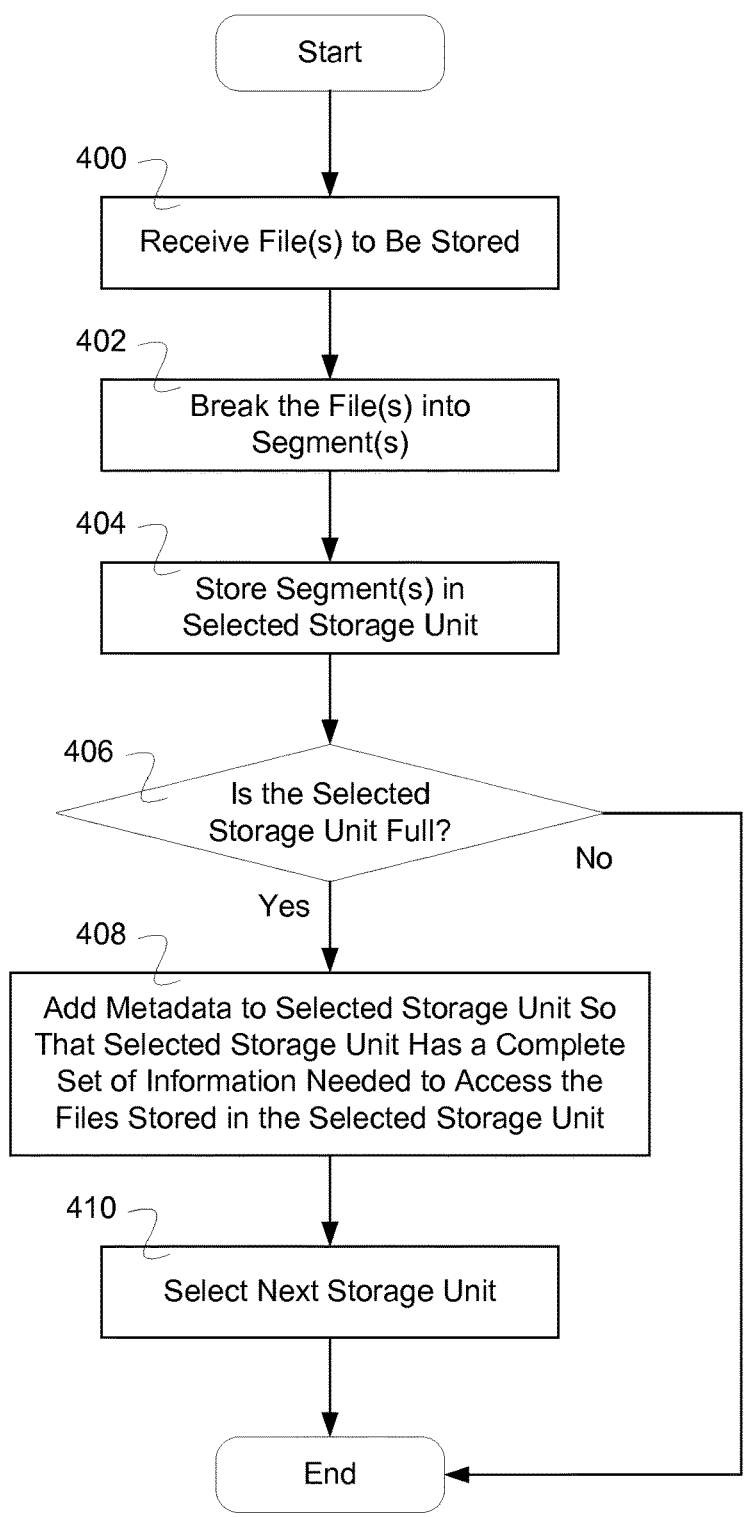
FIG. 4 is a flow diagram illustrating an embodiment of a process for storing data.

FIG. 4 is a flow diagram illustrating an embodiment of a process for storing data. In some embodiments, the process of FIG. 4 is used to store data in a storage system (e.g., the storage system of FIG. 1). In the example shown, in 400 file(s) is/are received to be stored. In 402, the file(s) is/are broken into segment(s). In various embodiments, the segments are generated from the file(s) by determining one or more segment boundaries based at least in part on the content of the file (e.g., where a portion of the content matches a value, where a portion of the content as input to a function (e.g., a hash function) matches a value, where a portion of the content as input to a function is a minimum, maximum, or other extrema value relative to the function value at other points in the file, etc.), not based on the content of the file (e.g., byte count, file markers, etc.), or any other appropriate manner of identifying segment boundaries. In 404, segment(s) is/are stored in a selected storage unit (e.g. the active storage unit). In 406, it is determined whether the selected storage unit is full. In the event that the storage unit is full, in 408 metadata is added to the selected storage unit so that the storage unit contains a complete set of information needed to access the file(s) stored in the selected storage unit. For example, the metadata includes a file name and reconstruction information for the file using the segments stored in the storage unit. The selected storage unit can be powered down, powered up, taken off-line, put on-line, and/or upgraded without impacting the rest of the data storage system. In 410, a next storage unit is selected, and the process ends. In the event that the selected storage unit is not full, the process ends.

In some embodiments, a storage unit is considered full if writing a new file and/or associated metadata information to the storage unit would exceed the storage unit capacity. In some embodiments, a partial file or metadata information is removed in the event that the entire file or associated metadata information would not fit in the storage unit.

Figure 5:
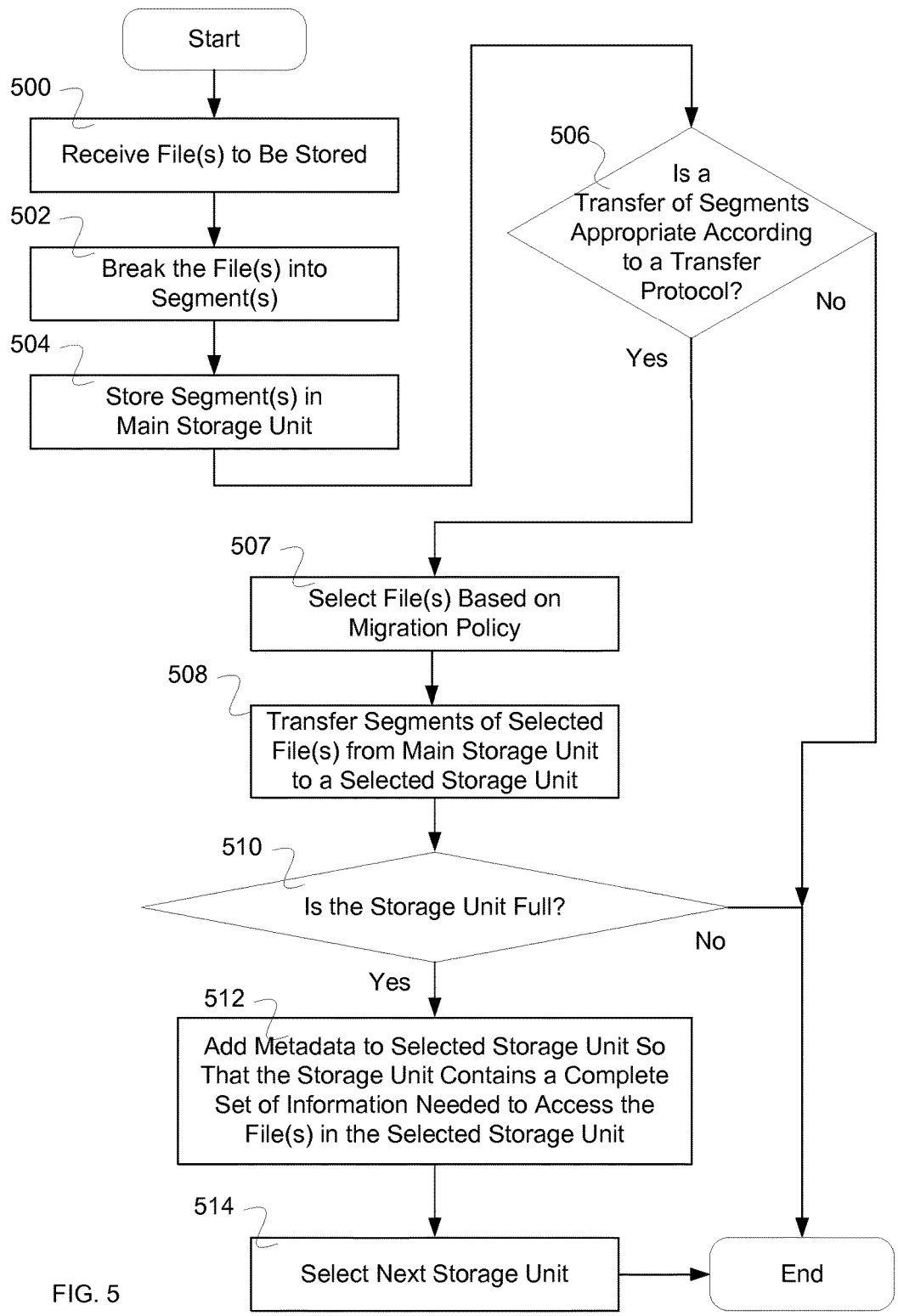
FIG. 5 is a flow diagram illustrating an embodiment of a process for storing data.

FIG. 5 is a flow diagram illustrating an embodiment of a process for storing data. In some embodiments, the process of FIG. 5 is used to store data in a storage system (e.g., the storage system of FIG. 3). In the example shown, in 500 file(s) is/are received to be stored. In 502, the file(s) is/are broken into segment(s). In various embodiments, the segments are generated from the file(s) by determining one or more segment boundaries based at least in part on the content of the file (e.g., where content in a window matches a value, where the content in a window as input to a function matches a value, where the content in a window as input to a function is a minimum, maximum, or other extrema value relative to the function value at other points in the file, etc.), not based on the content of the file (e.g., byte count, file markers, etc.), or any other appropriate manner of identifying segment boundaries. In 504, segment(s) is/are stored in a main storage unit. In 506, it is determined whether a transfer of segments is appropriate according to a transfer protocol. In the event that a transfer is not appropriate, the process ends. In the event that a transfer is appropriate, in 507 file(s) is/are selected based on a migration policy. For example, files are selected of certain file type, not modified or accessed for configured period of time for file type, etc.). In 508, segments of the selected files are transferred from the main storage unit to a selected storage unit. In 510, it is determined whether, the selected storage unit is full. In the event that the storage unit is full, in 512 metadata is added to the selected storage unit so that the storage unit contains a complete set of information needed to access the file(s) stored in the selected storage unit. For example, the metadata includes a file name and reconstruction information for the file using the segments stored in the storage unit. The selected storage unit can be powered down, powered up, taken off-line, put on-line, and/or upgraded without impacting the rest of the data storage system. In 514, a next storage unit is selected, and the process ends. In the event that the selected storage unit is not full, the process ends.

In some embodiments, a storage unit is considered full if writing a new file and/or associated metadata information to the storage unit would exceed the storage unit capacity. In some embodiments, a partial file or metadata information is removed in the event that the entire file or associated metadata information would not fit in the storage unit.

Figure 6:
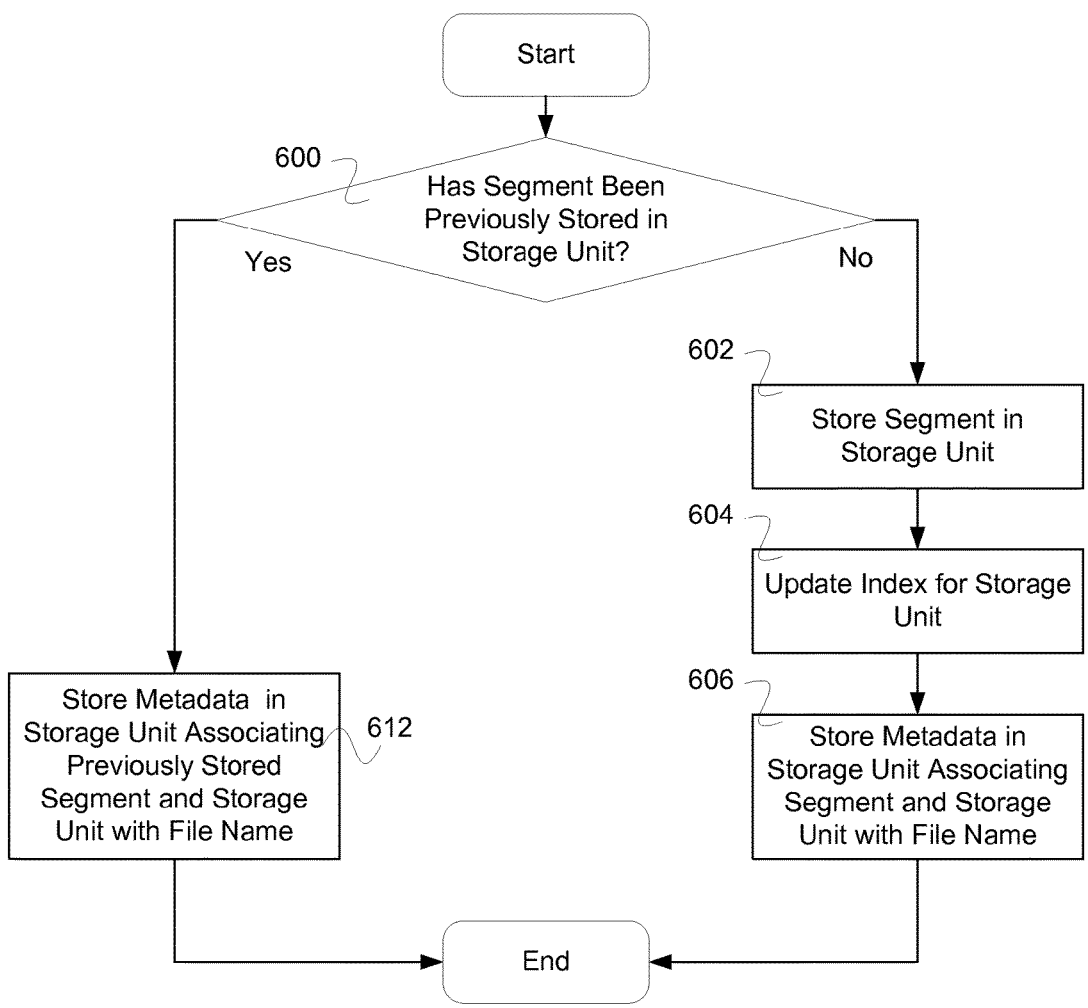
FIG. 6 is a flow diagram illustrating a process for storing a segment.

FIG. 6 is a flow diagram illustrating a process for storing a segment. In some embodiments, the process of FIG. 6 is used to implement 404 of FIG. 4 and/or 504 of FIG. 5. In the example shown, in 600 it is determined whether the segment has been previously stored in a storage unit. In various embodiments, the deduplication domain comprises the entire system or a storage unit or a group of storage units or any other appropriate storage device group in which case it is determined whether the segment has been previously stored in the entire system, the storage unit, the group of storage units, or the appropriate storage device group, respectively. In the event that the segment has been previously stored, in 612, metadata is stored in a storage unit associating the previously stored segment and the storage unit with the file name. For example, the metadata is stored in a main storage unit or an active storage unit and can be used to enable the reconstruction of a file with a file name by identifying the associated segments, the order that the segments are in, and any other instructions needed to reconstruct the file. In the event that the segment has not been previously stored, in 602 the segment is stored in a storage unit. For example, the segment is stored in a main storage unit, an active storage unit, etc. In 604, the index is updated for the storage unit. For example, the index has an entry added corresponding to the newly stored segment including an identifier for the segment (e.g., a fingerprint) and a location in the storage unit (e.g., a pointer to storage location in the storage unit). In 606, metadata is stored in a storage unit associating the segment and the storage unit with the file name. For example, the metadata is stored in a main storage unit or an active storage unit and can be used to enable the reconstruction of a file with a file name by identifying the associated segments, the order that the segments are in, and any other instructions needed to reconstruct the file.

Figure 7:
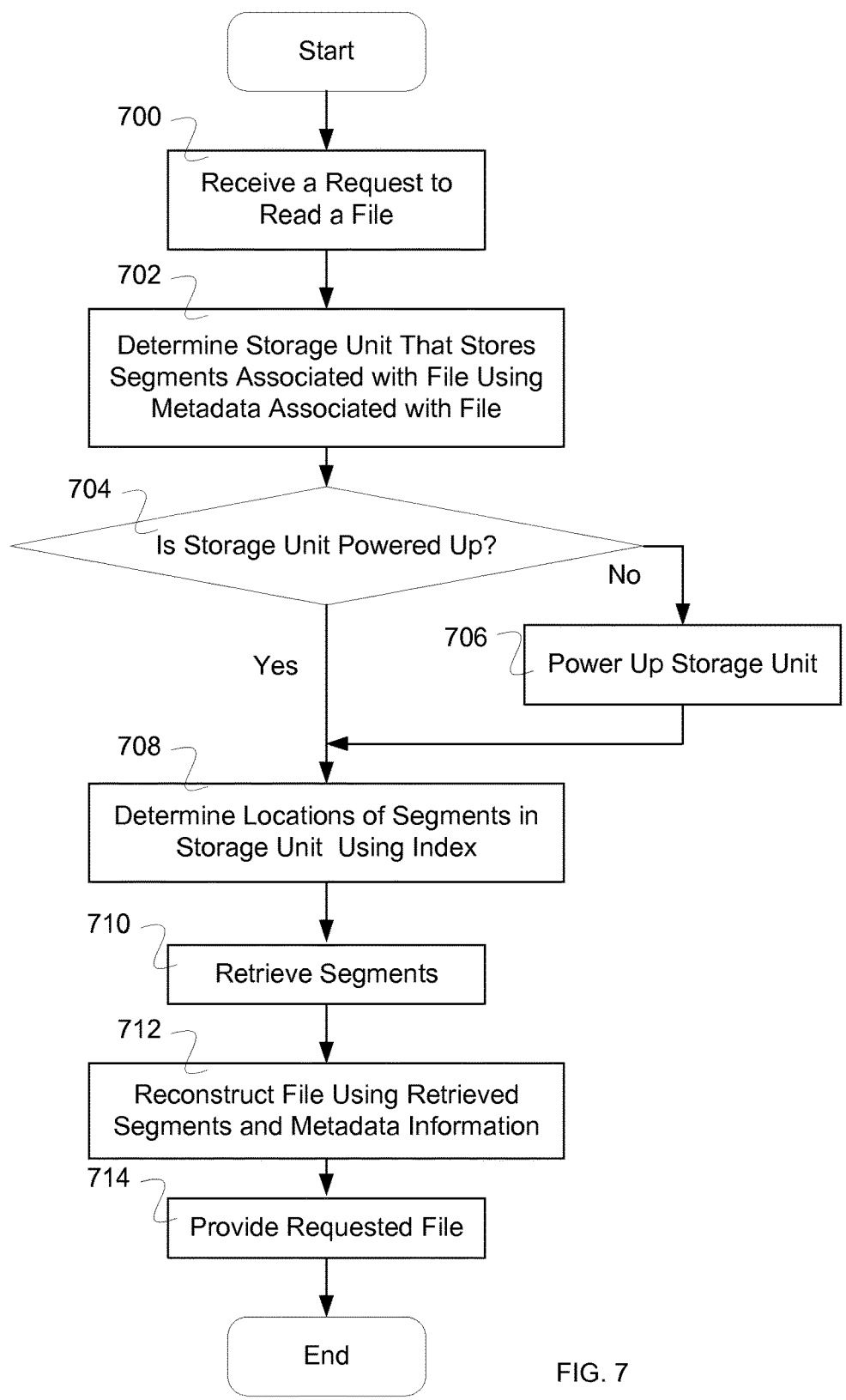
FIG. 7 is a flow diagram illustrating an embodiment of a process for reading a file from the storage system.

FIG. 7 is a flow diagram illustrating an embodiment of a process for reading a file from the storage system. In the example shown, in 700 a request to read a file is received. In 702, the storage unit is determined that stores segments associated with the file using metadata associated with the file. In 704, it is determined whether the storage unit is powered up. In the event that the storage unit is not powered up, in 706 the storage unit is powered up, and control passes to 708. In the event that the storage unit is powered up, in 708 the locations of the segments in the storage unit are determined using an index. In 710, the segments are retrieved. In 712, the file is reconstructed using retrieved segments and the metadata information. In 714, the requested file is provided.

In some embodiments, the segments associated with a file may be stored in more than one storage unit. For example, when the segments of a file are updated, the updated segments are stored in a main storage unit or an active storage unit while the other segments of the file may be stored in another storage unit.

In some embodiments, a power management protocol determines when to power down and up storage units. For example, storage units which have not received any requests for access in a given time are powered down, and storage units which receive frequent access or more access requests than a threshold number of accesses in a given period of time are kept powered up. In some embodiments, different levels of powering down are also indicated by the power management protocol—for example, powered on, spun down, parked, powered off, spinning, etc.—based on a desired speed of access or power savings.

Figure 8:
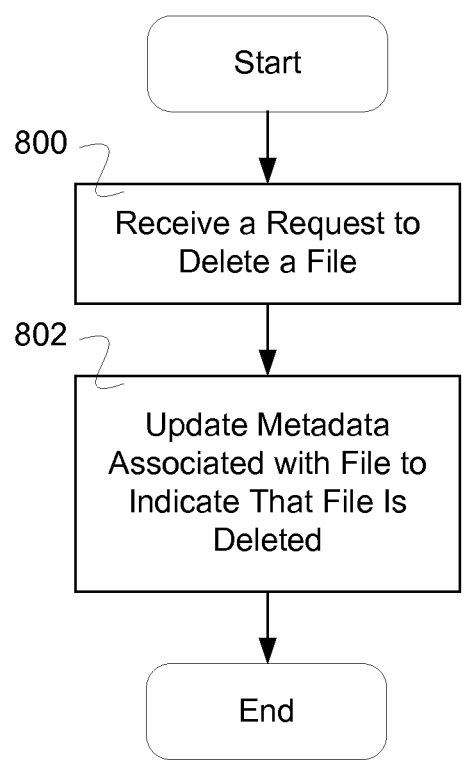
FIG. 8 is a flow diagram illustrating an embodiment of a process for deleting a file from the storage system.

FIG. 8 is a flow diagram illustrating an embodiment of a process for deleting a file from the storage system. In the example shown, in 800 a request is received to delete a file. In 802, metadata associated with the file is updated to indicate that the file is deleted.

In some embodiments, a cleaning process is performed periodically on the system to reclaim storage space used to store segments that are associated only with files that have been deleted.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for storing files, comprising:
a processor configured to:
 break a first file into one or more segments;
 store the one or more segments in a first storage unit in connection with a backup process, wherein the first storage unit is comprised in a remote storage system;
 determine whether contents of a first segment of the one or more segments stored in the first storage unit is identical to contents of at least a second segment stored in a second storage unit, wherein the second segment is a different segment from the one or more segments of the first file and one or more segments of a second file and the second segment is utilized to reconstruct a plurality of files including at least the first file to be stored or the second file;
 in the event that the contents of the first segment is not identical to the contents of the second segment, transfer the first segment from the first storage unit to the second storage unit and transfer a metadata associated with the first segment from the first storage unit to the second storage unit so that the first file can be accessed by the second storage unit independent of the first storage unit such that the first storage unit can be taken offline without impacting access to the first file, wherein a single namespace enables access for files stored in the first storage unit independent of the second storage unit and for files stored in the second storage unit independent of the first storage unit; and
 in the event that a set of metadata associated with the first storage unit or the second storage unit is lost or corrupted or damaged, reconstructing the set of metadata for the first storage unit or the second storage unit using metadata from any of the storage units of the remote storage system to ensure the single namespace still enables access for files stored in the first storage unit independent of the second storage unit and for files stored in the second storage unit independent of the first storage unit; and
a memory coupled to the processor and configured to provide the processor with instructions.

2. A system as in claim 1, wherein the first storage unit includes metadata information to provide access to files stored in the first storage unit and the second storage unit.

3. A system as in claim 1, wherein the first storage unit comprises a deduplication domain.

4. A system as in claim 1, wherein in the event that the first storage unit is full, the processor is further configured to store the one or more segments in a third storage unit.

5. A system as in claim 1, wherein according to a transfer protocol, the processor is further configured to identify a transfer file to be transferred according to a migration policy and to transfer a set of segments comprising the transfer file to a third storage unit.

6. A system as in claim 5, wherein the transfer protocol comprises a rule for transferring the set of segments in the event that the first storage unit is above a predetermined capacity limit.

7. A system as in claim 5, wherein the transfer protocol comprises a rule for transferring the set of segments according to a schedule.

8. A system as in claim 5, wherein the transfer protocol comprises a rule for transferring the set of segments in the event that the first storage unit is not being accessed.

9. A system as in claim 5, wherein transferring includes storing in the third storage unit metadata associated with the transfer file, enabling the transfer file to be accessed from the third storage unit.

10. A system as in claim 5, wherein the migration policy comprises a rule for identifying a transfer file in the event that the transfer file has not been accessed for a predetermined period of time.

11. A system as in claim 5, wherein the migration policy comprises a rule for identifying a transfer file in the event that the transfer file has been modified for a predetermined period of time.

12. A system as in claim 10, wherein the predetermined period of time is determined based at least in part on the type of file.

13. A system as in claim 5, wherein the third storage unit is powered down while the second storage unit remains operational for accessing files stored on the second storage unit.

14. A system as in claim 13, wherein the third storage unit is powered down when the third storage unit is predicted to be idle for some time.

15. A system as in claim 13, wherein powering down comprises one or more of the following: powering off some electronics of a disk in the third storage unit, spinning down a disk, powering down a disks, and powering down electronics in the third storage unit.

16. A system as in claim 2, wherein the processor is further configured to update the metadata in the first storage unit when an indication is received to delete a file.

17. A system as in claim 16, wherein segments associated only with deleted file are discarded during a space reclamation process.

18. A system as in claim 1, wherein the first storage unit is replicated by copying stored segments and metadata.

19. A system as in claim 1, wherein breaking the first file into one or more segments comprises determining segment boundaries.

20. A system as in claim 19, wherein segment boundaries are determined based at least in part on the content of the first file.

21. A system as in claim 20, wherein segment boundaries are determined based at least in part on a value calculated using a function applied to at least a portion of the first file.

22. A method for storing data, comprising:
breaking a first file into one or more segments;
storing the one or more segments in a first storage unit in connection with a backup process, wherein the first storage unit is comprised in a remote storage system;
determining whether contents of a first segment of the one or more segments stored in the first storage unit is identical to contents of at least a second segment stored in a second storage unit, wherein the second segment is a different segment from the one or more segments of the first file and one or more segments of a second file and the second segment is utilized to reconstruct a plurality of files including at least the first file to be stored or the second file;
in the event that the contents of the first segment is not identical to the contents of the second segment, transferring the first segment from the first storage unit to the second storage unit and transferring a metadata associated with the first segment from the first storage unit to the second storage unit so that the first file can be accessed by the second storage unit independent of the first storage unit such that the first storage unit can be taken offline without impacting access to the first file, wherein a single namespace enables access for files stored in the first storage unit independent of the second storage unit and for files stored in the second storage unit independent of the first storage unit; and
in the event that a set of metadata associated with the first storage unit or the second storage unit is lost or corrupted or damaged, reconstructing the set of metadata for the first storage unit or the second storage unit using metadata from any of the storage units of the remote storage system to ensure the single namespace still enables access for files stored in the first storage unit independent of the second storage unit and for files stored in the second storage unit independent of the first storage unit.

23. A computer program product for storing data, the computer program product being embodied in a computer readable storage medium and comprising computer instructions for:
breaking a first file into one or more segments;
storing the one or more segments in a first storage unit in connection with a backup process, wherein the first storage unit is comprised in a remote storage system;
determining whether contents of a first segment of the one or more segments stored in the first storage unit is identical to contents of at least a second segment stored in a second storage unit, wherein the second segment is a different segment from the one or more segments of the first file and one or more segments of a second file and the second segment is utilized to reconstruct a plurality of files including at least the first file to be stored or the second file;
in the event that the contents of the first segment is not identical to the contents of the second segment, transferring the first segment from the first storage unit to the second storage unit and transferring a metadata associated with the first segment from the first storage unit to the second storage unit so that the first file can be accessed by the second storage unit independent of the first storage unit such that the first storage unit can be taken offline without impacting access to the first file, wherein a single namespace enables access for files stored in the first storage unit independent of the second storage unit and for files stored in the second storage unit independent of the first storage unit; and
in the event that a set of metadata associated with the first storage unit or the second storage unit is lost or corrupted or damaged, reconstructing the set of metadata for the first storage unit or the second storage unit using metadata from any of the storage units of the remote storage system to ensure the single namespace still enables access for files stored in the first storage unit independent of the second storage unit and for files stored in the second storage unit independent of the first storage unit.

* * * * *